Figure 1:
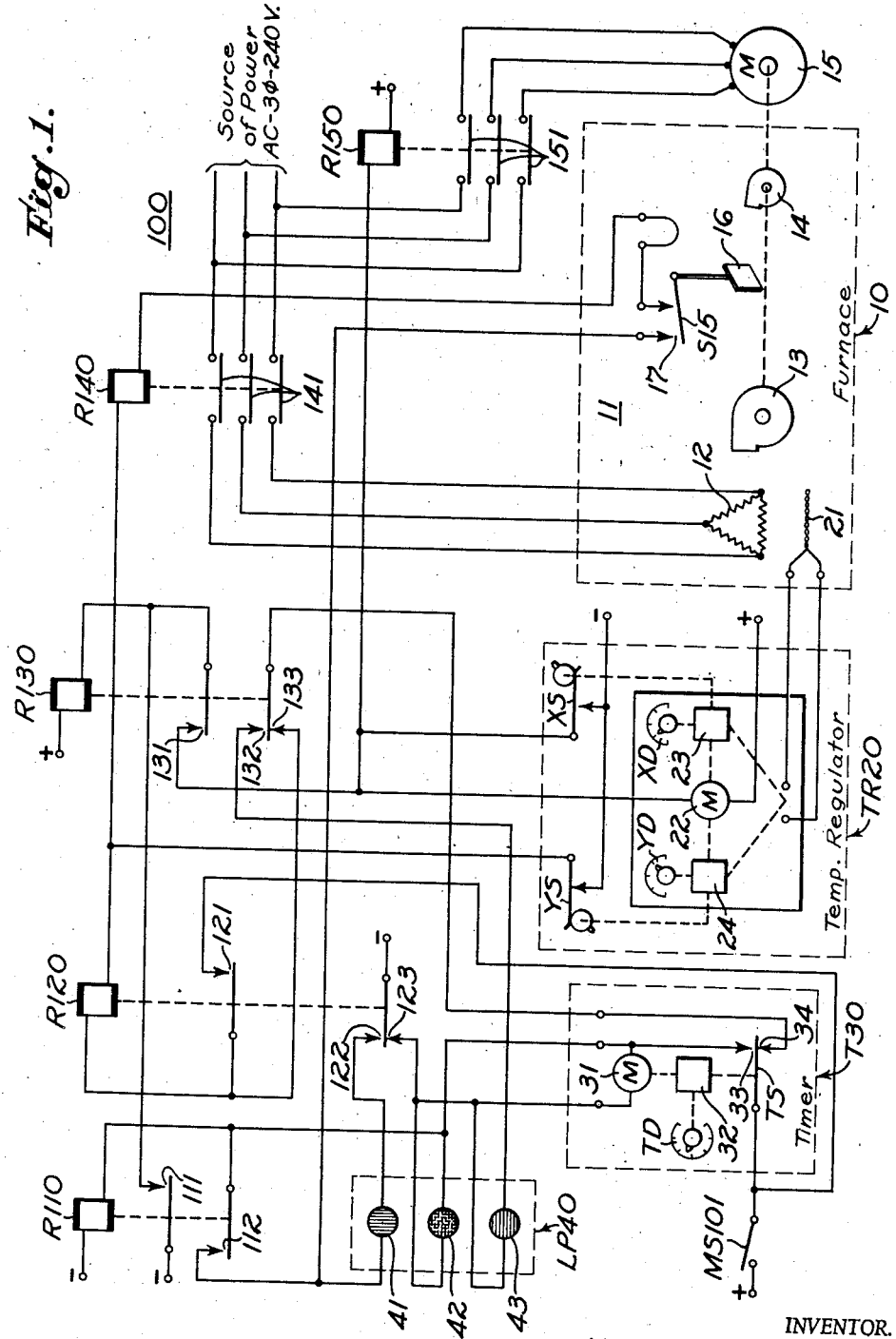

Oct. 29, 1946.   H. W. LINDSAY   2,410,384
FURNACE CONTROL SYSTEM
Filed Feb. 3, 1945   2 Sheets-Sheet 1

INVENTOR.
HAROLD W. LINDSAY
BY Robert A. Lavender
ATTORNEY.

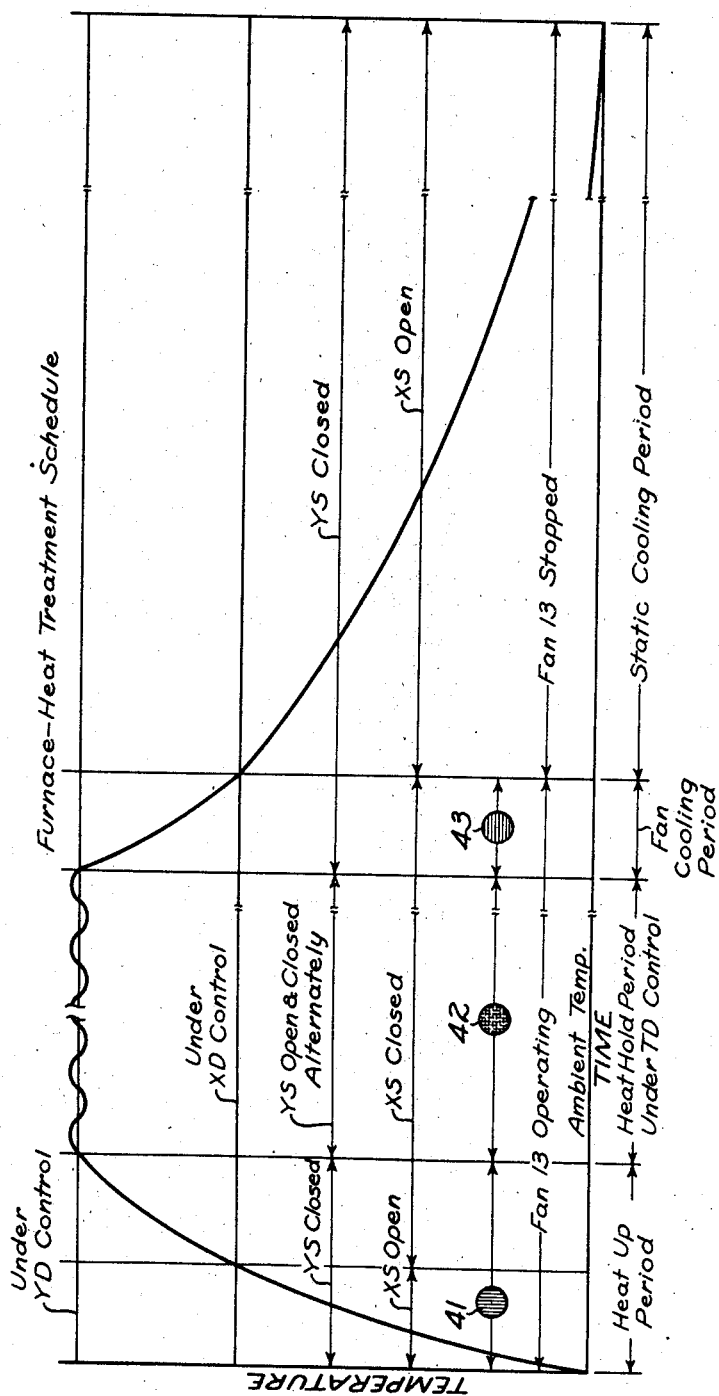

Patented Oct. 29, 1946

2,410,384

UNITED STATES PATENT OFFICE 2,410,384

FURNACE CONTROL SYSTEM

Harold W. Lindsay, Oakland, Calif., assignor to the Government of the United States as represented by the Director of the Office of Scientific Research and Development, Office for Emergency Management Application February 3, 1945, Serial No. 576,125

4 Claims. (Cl. 219—20)

The present invention relates to heat exchange systems and more particularly to furnace control systems.

In many heat treating operations, such as in the annealing of glass, it is desirable to heat a batch substantially uniformly throughout and fairly rapidly from the ambient temperature to a predetermined relatively high temperature, to hold the relatively high temperature of the batch substantially uniformly throughout for a predetermined time interval, to cool the batch substantially uniformly throughout and reasonably rapidly from the relatively high temperature to a predetermined relatively low temperature above the ambient temperature. Moreover, in view of the mass, composition, and other characteristics of the batch, the relatively high temperature and the relatively low temperature must be selectively and independently adjustable within given ranges, and also the predetermined time interval must be selectively adjustable within a given range.

Heretofore these operations have been carried out in furnaces provided with manually controllable adjustments by operators utilizing data cards and charts, together with such instruments as stop watches and pyrometers.

Accordingly, it is an object of the present invention to provide a control system that is operative automatically to govern an associated furnace in order to carry out a heat exchange schedule of the general character specified.

Another object of the invention is to provide in a heat exchange system, including a work receiving enclosure and facility for selectively setting a desired temperature within a given range and for selectively setting a desired time interval within a given range, an arrangement for automatically regulating the temperature of the enclosure throughout a time duration respectively corresponding substantially to the preset desired temperature and to the preset desired time interval.

A further object of the invention is to provide in a furnace control system, including facility for carrying out automatically a predetermined heat treating schedule, an improved signal arrangement for selectively indicating and identifying the successive heating and cooling steps as they are carried out.

A still further object of the invention is to provide a furnace control system comprising an improved and extremely simplified electric circuit network.

The invention, both as to its organization and method of operation, together with further objects and advantages thereof, will best be understood by reference to the following specification taken in connection with the accompanying drawings in which Figure 1 is a diagrammatic illustration of a furnace control system embodying the present invention; and Fig. 2 is a graph illustrating a typical heat treating schedule which may be carried out in the furnace enclosure of the furnace control system.

Referring now more particularly to Fig. 1 of the drawings, there is illustrated a heat exchange system in the form of a furnace control system embodying the features of the present invention and comprising a furnace 10. Preferably, the furnace 10 is of conventional construction and arrangement including heat insulated wall structure defining an enclosure or work receiving space 11 and provided with a doorway and associated door, not shown, permitting ready placement and removal of the work within the enclosure 11.

Also the furnace 10 is provided with an electric heating element 12 adapted to supply heat to the enclosure 11, and a main fan 13 operative to induce circulation of air or a suitable heating medium over the electric heating element 12 and through the enclosure 11 in order to effect a substantially uniform distribution of heat throughout the enclosure or work receiving space 11. The electric heating element 12 is illustrated as being of the three-phase alternating current delta-connected type, although it may be of any suitable form. Moreover, the electric heating element 12 may be carried by a support disposed within the enclosure 11; or, on the other hand, it may be distributed about and secured directly to the wall structure of the furnace 10 within the enclosure 11. Further, the furnace 10 comprises an auxiliary fan 14, and an electric motor 15 operatively connected to the main fan 13 and to the auxiliary fan 14, whereby both of the fans 13 and 14 are commonly operated by the motor 15. Preferably, the electric motor 15 is disposed exteriorly of the furnace 10 and is provided with an operating shaft extending through the wall structure of the furnace 10 and commonly connected to the fans 13 and 14 disposed within the enclosure 11. As illustrated, the electric motor 15 is of the three-phase alternating current type, although it may be of any suitable form. Associated with the auxiliary fan 14 is a vane switch S15 provided with an operating arm carrying a vane 16 and controlling contacts 17, the vane 16 being arranged in the blast delivered from the auxiliary fan 14. Accordingly, it will be understood that when the motor 15 is operated, the main fan 13 is operated to induce circulation of a heating medium over the electric heating element 12 and through the enclosure 11, and the auxiliary fan 14 is operated in order to effect operation of the vane switch S15 to close the contacts 17 for a purpose more fully explained hereinafter. Finally, the furnace 10 comprises a temperature responsive element 21 in the form of a thermocouple arranged within the enclosure 11 and controlled by the temperature of the heating medium circulated therein.

Also the system comprises a temperature regulator TR20 of the conventional Leeds & Northrup type, including an electric operating motor 22, two temperature dials XD and YD, two switches XS and YS, and two mechanisms indicated generally at 23 and 24. The temperature regulator TR20 is connected to the thermocouple 21; the mechanism 23 is governed jointly by the temperature dial XD, the thermocouple 21 and the operating motor 22, and selectively controls the switch XS; while the mechanism 24 is governed jointly by the temperature dial YD, the thermocouple 21 and the operating motor 22, and selectively controls the switch YS. The temperature dial XD may be manually set to a relatively low temperature, within a given range, below which it is not desired to make an observation with reference to the temperature of an article or batch of material undergoing heat treatment in the enclosure 11; while the temperature dial YD may be manually set to a relatively high temperature, within a given range, at which it is desired to maintain the temperature of the article or batch of material undergoing heat treatment in the enclosure 11.

Further, the system comprises a timer T30 of a conventional type including an electric operating motor 31, a time dial TD, a switch TS, and a mechanism indicated generally at 32. The mechanism 32 is governed jointly by the time dial TD and the operating motor 31, and selectively controls the switch TS. The time dial TD may be set manually to a time interval, within a given range, during which it is desired to subject the article or the batch of material undergoing heat treatment in the enclosure 11 to the temperature preset by the temperature dial YD of the temperature regulator TR20, as explained more fully hereinafter.

Further, the system comprises a lamp panel LP 40 including red, yellow, and blue lamps 41, 42, and 43, respectively; and a circuit network 100 including a master switch MS101, five relays R110, R120, R130, R140, and R150, a source of three-phase alternating current 240-volt power supply, and a source of control supply (a battery, the terminals of which are indicated by the signs + and −). While the source of power supply has been indicated as being three-phase alternating current 240-volt, it will be understood that it may be any appropriate source of power supply effective to operate the electric heating element 12 and the motor 15; and while the source of control supply has been indicated as being a battery, it will be understood that it may be any appropriate source of control supply, and in fact may include one phase of the source of power supply. The connection and arrangement of the circuit network 100 will best be understood in conjunction with the following description of the operation of the furnace control system in order to carry out a heat treating schedule in the enclosure 11.

Referring now more particularly to Figs. 1 and 2, assume that the elements of the circuit network 100 occupy their normal rest positions illustrated, and that an article or batch of material that is to be subjected to a heat treating schedule has been placed in the enclosure 11. The operator first closes the master switch MS101, thereby completing a circuit including the contacts 34 of the switch TS, the contacts 133 of the relay R130, and the contacts YS of the temperature regulator TR20, for energizing the winding of the relay R120. When thus energized, the relay R120 operates to complete at its contacts 121 a stick circuit including the master switch MS101 and the contacts YS of the temperature regulator TR20, for energizing the winding thereof. Also, the relay R120 prepares at its contacts 122 a circuit, traced hereinafter, for illuminating the red lamp 41, and interrupts at its contacts 123 a further point in multiple circuits, traced hereinafter, for illuminating the yellow and blue lamps 42 and 43 and for operating the motor 31.

Next, the operator sets the temperature dial XD of the temperature regulator TR20 to a relatively low temperature, within its range, below which it is not desired to make an observation of the article with reference to the temperature of the article or the batch of material which is to undergo heat treatment in the enclosure 11; and sets the temperature dial YD of the temperature regulator TR20 to a relatively high temperature, within its range, at which it is desired to maintain the temperature of the article or batch of material which is to undergo heat treatment in the enclosure.

Finally, the operator sets the time dial TD on the timer T30 to a time interval, within its range, during which time interval it is desired to subject the article or batch of material which is to undergo heat treatment in the enclosure 11 to the temperature preset by the temperature dial YD of the temperature regulator TR20. When the time dial TD on the timer T30 is set to establish the time interval mentioned, the associated switch TS is operated through the mechanism 32 to open its contacts 34 and to close its contacts 33. More particularly, when the switch TS is operated, it interrupts at its contacts 34 the previously traced operating circuit for energizing the winding of the relay R120; however, the latter relay remains in its operated position at this time due to the previously traced completed stick circuit for energizing the winding thereof. Also, when the switch TS is operated it completes at its contacts 33 a circuit including the master switch MS101 for energizing the winding of the relay R110. When thus energized, the relay R110 operates to complete at its contacts 111 an obvious circuit for energizing the winding of the relay R130, and completes at its contacts 112 a circuit including the master switch MS101, the contacts 33 of the switch TS, and the contacts 122 of the relay R120, for illuminating the red lamp 41. The illumination of the red lamp 41 on the lamp panel LP40 indicates that operation of the system has been initiated but that the temperature of the enclosure 11 has not reached the desired relatively high temperature preset by the temperature dial YD of the temperature regulator TR20. When thus energized, the relay R130 operates to complete at its contacts 131 a multiple circuit including the contacts 111 of the relay R110, for operating the motor 22 and for energizing the winding of the relay R150. Also, the relay R130 interrupts at its contacts 133 a further point in the previously traced operating circuit for energizing the winding of the relay R120, and prepares at its contacts 132 a circuit traced hereinafter for illuminating the blue lamp 43. Operation of the motor 22 renders the temperature regulator TR20 effective in a manner more fully explained hereinafter.

When thus energized, the relay R150 operates to complete at its contacts 151 a connection between the source of power and the motor 15, whereby operation of the motor 15 is initiated, effecting operation of both the main fan 13 and the auxiliary fan 14. The blast from the main fan 13 is directed over the electric heating element 12 which is not operated at this time, whereas the blast from the auxiliary fan 14 is directed upon the vane 16, effecting operation of the vane switch S15, whereby its contacts 17 are closed to complete a circuit for energizing the winding of the relay R140. The last-mentioned circuit extends from the positive terminal by way of the master switch MS101, the contacts 33 of the switch TS, the contacts 112 of the relay R110, the contacts 17 of the switch S15, the winding of the relay R140, and the contacts YS of the temperature regulator TR20 to the negative terminal. When thus energized, the relay R140 operates to complete at its contacts 141 a connection between the source of power and the electric heating element 12, whereby the electric heating element 12 is heated. At this time, the blast of air from the main fan 13, directed over the electric heating element 12, induces circulation of the heating medium in the enclosure 11, whereby the article or batch of material in the enclosure 11 is heated. Also, the heating medium is circulated past the thermocouple 21 in order to control the temperature regulator TR20, in a manner more fully explained hereinafter.

At this time, the enclosure 11 is heated up from the ambient temperature toward the relatively high temperature established by the temperature dial YD of the temperature regulator TR20, and the red lamp 41 on the lamp panel LP40 is illuminated in order to indicate that the temperature of the article or batch of material in the enclosure 11 has not yet reached the relatively high temperature mentioned. When the relatively low temperature established by the temperature dial XD of the temperature regulator TR20 is reached, the thermocouple 21 governs the temperature regulator TR20, whereby the motor 22 through the mechanism 23 operates the switch XS. More particularly, when the switch XS is thus operated, a multiple lock circuit for energizing the windings of the relays R130 and R150 and for operating the motor 22 is completed. This multiple lock circuit extends from the positive terminal by way of the winding of the relay R130 and its contacts 131 to the switch XS, from the positive terminal by way of the winding of the relay R150 to the switch XS, from the positive terminal by way of the motor 22 to the switch XS, and from the switch XS to the negative terminal. At this time, the temperature of the enclosure 11 continues to rise from the relatively low temperature established by the temperature dial XD of the temperature regulator TR20 toward the relatively high temperature established by the temperature dial YD of the temperature regulator TR20.

Now assuming that the temperature of the enclosure 11 of the furnace 10 has reached the relatively high temperature established by the temperature dial YD of the temperature regulator TR20, and in fact has risen slightly thereabove, the thermocouple 21 governs the temperature regulator TR20, whereby the motor 22 through the mechanism 24 operates the switch YS. When the switch YS is thus operated, it interrupts the previously traced multiple circuit for energizing the windings of the relays R120 and R140, thereby to cause the latter relays to restore. Upon restoring, the relay R120 interrupts at its contacts 121 a further point in the previously traced stick circuit for energizing the winding thereof, interrupts at its contacts 122 the previously traced circuit for illuminating the red lamp 41, and completes at its contacts 123 the previously mentioned multiple circuit for illuminating the yellow lamp 42 and for operating the motor 31. This multiple circuit for illuminating the yellow lamp 42 and for operating the motor 31 extends from the positive terminal by way of the master switch MS101 and the contacts 33 of the switch TS, to the yellow lamp 42 and to the motor 31, and from the negative terminal by way of the contacts 123 of the relay R120 to the yellow lamp 42 and to the motor 31. Upon restoring, the relay R140 interrupts at its contacts 141 the previously mentioned connection between the source of power and the electric heating element 12, whereby the electric heating element 12 begins to cool due to continued operation of the main fan 13 by the motor 15. At this time, the temperature of the enclosure 11 begins to fall back toward the relatively high temperature established by the temperature dial YD of the temperature regulator TR20, and in fact slightly therebelow.

On the lamp panel LP40, when the red lamp 41 is extinguished and the yellow lamp 42 is illuminated, it indicates that the relatively high temperature preset on the temperature dial YD of the temperature regulator TR20 has been reached in the enclosure 11 of the furnace 10, and that the timing operation established by the time dial TD of the timer T30 has begun. Also, operation of the motor 31 initiates the timing operation of the timer T30 preset on the time dial TD thereof.

Now assuming that the temperature of the enclosure 11 has reached the relatively high temperature established by the temperature dial YD of the temperature regulator TR20, and in fact has fallen slightly therebelow, the thermocouple 21 governs the temperature regulator TR20, whereby the motor 22 through the mechanism 24 operates the switch YS. When the switch YS is thus operated, it recompletes the previously traced circuit for energizing the winding of the relay R140; however, the previously traced multiple stick circuit for energizing the winding of the relay R120 is not completed at this time. When thus energized, the relay R140 reoperates; whereas the relay R120 remains in its restored position. Upon reoperating, the relay R140 again completes at its contacts 141 the previously mentioned connection between the source of power and the electric heating element 12, whereby the electric heating element 12 is again heated in order to cause the temperature of the enclosure 11 to rise again to the relatively high temperature established by the temperature dial YD of the temperature regulator TR20, and in fact slightly thereabove.

The two above-described operations are repeated alternately in a cyclic manner, whereby the electric heating element 12 is connected to and disconnected from the source of power, respectively as the temperature of the enclosure 11 falls slightly below and rises slightly above the relatively high temperature established by the temperature dial YD of the temperature regulator TR20, in order that the average temperature of the enclosure 11 is closely held at the relatively high temperature mentioned. More particularly, the cyclic operation above described continues for the time interval established by the time dial TD of the timer T30; and upon the expiration of the time interval mentioned, the timer T30, through the mechanism 32, resets the time dial TD to its normal position. In the timer T30, when the time dial TD is reset to its normal position, the switch TS is operated back to its normal position through the mechanism 32.

More particularly at this time, upon operating the switch TS interrupts at its contacts 33 the previously traced multiple circuit for illuminating the yellow lamp 42 and for operating the motor 31, whereby the yellow lamp 42 is extinguished and operation of the motor 31 is arrested. Also, the switch TS interrupts at the contacts 33 the previously traced circuit for energizing the winding of the relay R140, in the event the latter relay happens to be operated at this time, thereby to cause the relay R140 to restore and disconnect at its contacts 141 the electric heating element 12 from the source of power. Further, upon operating the switch TS interrupts at its contacts 33 the previously traced circuit for energizing the winding of the relay R110, thereby to cause the latter relay to restore. Upon restoring, the relay R110 interrupts at its contacts 111 the previously traced operating circuit for energizing the winding of the relay R130; however, the latter relay remains in its operated position at this time, due to the previously completed lock circuit for energizing the winding thereof. Also, upon operating the switch TS completes at its contacts 34 a circuit for illuminating the blue lamp 43, this circuit extending from the positive terminal by way of the master switch MS101, the contacts 34 of the switch TS, the contacts 132 of the relay R130, the blue lamp 43, and the contacts 123 of the relay R120, to the negative terminal. Accordingly, at this time on the lamp panel LP40, the yellow lamp 42 is extinguished and the blue lamp 43 is illuminated, thereby to indicate that the heating of the enclosure 11 has been arrested and that it is undergoing forced cooling by the main fan 13.

More particularly, at this time, in the circuit network 100 the relays R110, R120, and R140 occupy their restored positions, while the relays R130 and R150 occupy their operated positions, the last-mentioned relays being retained in their operated positions due to the previously completed multiple lock circuit for energizing the windings thereof. Also at this time, the operation of the motor 31 of the timer T30 is arrested, while operation of the motor 22 of the temperature regulator TR20 continues. The operated relay R150 retains at its contacts 151 the previously mentioned connection between the motor 15 and the source of power, whereby operation of the motor 15, and consequently the main fan 13, is continued.

Operation of the main fan 13 at this time, when the electric heating element 12 is disconnected from the source of power, effects a forced cooling of the enclosure 11, whereby the temperature of the enclosure 11 falls from the relatively high temperature established by the temperature dial YD of the temperature regulator TR20 to the relatively low temperature established by the temperature dial XD of the temperature regulator TR20. When the temperature of the enclosure 11 of the furnace 10 reaches the relatively low temperature established by the temperature dial XD of the temperature regulator TR20, the thermocouple 21 governs the temperature regulator TR20, whereby the motor 22, through the mechanism 23, operates the switch XS. More particularly at this time, when the switch XS is thus operated, the previously traced multiple lock circuit for energizing the windings of the relays R130 and R150 and for operating the motor 22 is interrupted, whereby the relays R130 and R150 restore and operation of the motor 22 is arrested.

Upon restoring, the relay R130 interrupts at its contacts 131 a further point in the previously traced lock circuit for energizing the winding thereof, interrupts at the contacts 132 the previously traced circuit for illuminating the blue lamp 43, and recompletes at its contacts 133 the previously traced operating circuit for energizing the winding of the relay R120. When thus energized, the relay R120 reoperates, thereby to complete at its contacts 121 the previously traced stick circuit for energizing the winding thereof and to prepare at its contacts 122 the previously traced circuit for illuminating the red lamp 41. When the blue lamp 43 on the lamp panel LP40 is extinguished, it indicates that the temperature of the enclosure 11 has fallen below the relatively low temperature established by the temperature dial XD of the temperature regulator TR20. Upon restoring, the relay R150 disconnects at its contacts 151 the motor 15 from the source of power, whereby further operation of the motor 15, and consequently the main fan 13, is arrested. At this time, the temperature of the enclosure 11 continues to fall from the relatively low temperature established by the temperature dial XD of the temperature regulator TR20 toward the ambient temperature, entirely due to radiation and other heat losses, in that the operation of the main fan 13 has been arrested.

At this time, another heating schedule of the enclosure 11 may be initiated by the operator merely by reoperating the time dial TD on the timer T30 to the appropriate time interval, assuming that the operator is satisfied with the previously-set relatively high and relatively low temperatures which have been established by the temperature dials YD and XD, respectively, of the temperature regulator TR20. On the other hand, in the event that the enclosure 11 is to be reoperated through a heating schedule at different relatively high and relatively low temperatures, the temperature dials YD and XD of the temperature regulator TR20 are adjusted by the operator to the appropriate temperatures, within their ranges, prior to resetting the time dial TD of the timer T30 to the desired time interval, within its range, in the manner previously explained. Finally, when no further operation of the furnace 10 is required, the master switch MS101 is operated to its open position, thereby to interrupt the previously traced stick circuit for energizing the winding of the relay R120 in order to cause the latter relay to restore. At this time, all of the apparatus incorporated in the furnace control system is completely released.

With particular reference to Fig. 2 it will be understood that in carrying out the heat treatment schedule above-described that the main fan 13 is operated during the initial heat-up period in order to cause the temperature of the enclosure 11 to be raised substantially uniformly throughout from the ambient temperature to the relatively high temperature established by the temperature dial YD, during the heat-hold period in order to cause the temperature of the enclosure 11 to be maintained substantially uniformly throughout at the relatively high temperature established by the temperature dial YD, and during the fan cooling period in order to cause the temperature of the enclosure 11 to be lowered substantially uniformly throughout from the relatively high temperature established by the temperature dial YD to the relatively low temperature established by the temperature dial XD. Also in carrying out the heat treatment schedule operation of the main fan 13 is arrested during the static cooling period in order to cause the temperature of the enclosure 11 to be lowered due to normal heat losses from the relatively low temperature established by the temperature dial XD to the ambient temperature; during which period forced cooling by the main fan 13 is not required as substantially uniform cooling of the enclosure 11 is of no particular importance. Finally, it is noted that the temperature of the batch arranged within the enclosure 11 closely follows the changes in temperature of the enclosure 11 described above.

In view of the foregoing description of the connection and arrangement and the mode of operation of the furnace control system in conjunction with the heat treating schedule of an article or batch of material placed in the enclosure of the furnace, it will be understood that the operations are entirely automatic after the appropriate controls have been set and rendered effective in the manner explained. Also, it will be appreciated that both the relatively high temperature which is to be held in the enclosure of the furnace and the relatively low temperature below which it is not desirable to make observations and below which forced cooling of the enclosure is not required may be set selectively within given ranges; and that also, the time duration of the relatively high temperature which is to be held in the enclosure may be set selectively within a given range. The last-mentioned feature is very advantageous, in view of the fact that in the furnace control system the relatively high temperature which is to be held in the enclosure of the furnace is held for the required time interval, regardless of the ambient temperature of the enclosure of the furnace when operation is initiated.

While there has been described what is at present considered to be the preferred embodiment of the invention, it will be understood that various modifications may be made therein, and it is intended to cover in the appended claims all such modifications as fall within the true spirit and scope of the invention

What is claimed is:

1. A heating system comprising a furnace, a heating element associated with said furnace and operative to supply heat thereto, first and second signals associated with said furnace, a temperature regulator adapted to be set selectively within a given range to a desired furnace temperature, a timer adapted to be set selectively within a given range to a desired timing operation, start means for initiating operation of said heating element and for initiating operation of said first signal, whereby the temperature of said furnace is increased from an ambient temperature toward said desired furnace temperature, means controlled by said temperature regulator in response to the temperature of said furnace reaching said desired furnace temperature for arresting operation of said first signal and for initiating operation of said second signal and for initiating said desired timing operation of said timer, means governed by said temperature regulator after the temperature of said furnace reaches said desired furnace temperature for selectively controlling the operation of said heating element, thereby to maintain the temperature of said furnace substantially at said desired furnace temperature, and stop means controlled by said timer in response to the completion of said desired timing operation thereof for arresting operation of said second signal and for arresting operation of said heating element.

2. A heating system comprising structure defining an enclosure, a heating element operative to supply heat, means operative to induce circulation of a heating medium past said heating element and through said enclosure, a temperature regulator adapted to be set selectively within given ranges to a relatively high desired enclosure temperature and to a relatively low desired control temperature, a timer adapted to be set selectively within a given range to a desired timing operation, start means for initiating operation of said circulation-inducing means, means controlled by the operation of said circulation-inducing means for initiating operation of said heating element, whereby the temperature of said enclosure is increased from an ambient temperature through said desired control temperature toward said desired enclosure temperature, means controlled by said temperature regulator in response to the temperature of said enclosure reaching said desired enclosure temperature for initiating said desired timing operation of said timer, means governed by said temperature regulator after the temperature of said enclosure reaches said desired enclosure temperature for selectively controlling the operation of said heating element, thereby to maintain the temperature of said enclosure substantially at said desired enclosure temperature, means controlled by said timer in response to the completion of said desired timing operation thereof for arresting operation of said heating element, whereby the temperature of said enclosure is decreased from said desired enclosure temperature through said desired control temperature toward the ambient temperature, and stop means controlled by said temperature regulator in response to the temperature of said enclosure reaching said desired control temperature for arresting operation of said circulation-inducing means.

3. A heating system comprising structure defining an enclosure, a heating element operative to supply heat, a fan associated with said heating element and operative to circulate a heating medium past said heating element and through said enclosure, a temperature regulator adapted to be set selectively within given ranges to a relatively high desired enclosure temperature and to a relatively low desired control temperature, a timer adapted to be set selectively within a given range to a desired timing operation, start means for initiating operation of said fan, means controlled by the operation of said fan for initiating operation of said heating element, whereby the temperature of said enclosure is increased from an ambient temperature through said desired control temperature toward said desired enclosure temperature, means controlled by said temperature regulator in response to the temperature of said enclosure reaching said desired enclosure temperature for initiating said desired timing operation of said timer, means governed by said temperature regulator after the temperature of said enclosure reaches said desired enclosure temperature for selectively controlling the operation of said heating element, thereby to maintain the temperature of said enclosure substantially at said desired enclosure temperature, means controlled by said timer in response to the completion of said desired timing operation thereof for arresting operation of said heating element, whereby the temperature of said enclosure is decreased from said desired enclosure temperature through said desired control temperature toward the ambient temperature, and stop means controlled by said temperature regulator in response to the temperature of said enclosure reaching said desired control temperature for arresting operation of said fan.

4. A heating system comprising structure defining an enclosure, a heating element operative to supply heat, a fan associated with said heating element and operative to circulate a heating medium past said heating element and through said enclosure, first and second and third signals associated with said enclosure, a temperature regulator adapted to be set selectively within given ranges to a relatively high desired enclosure temperature and to a relatively low desired control temperature, a timer adapted to be set selectively within a given range to a desired timing operation, start means for initiating operation of said fan and for initiating operation of said first signal, means controlled by the operation of said fan for initiating operation of said heating element, whereby the temperature of said enclosure is increased from an ambient temperature through said desired control temperature toward said desired enclosure temperature, means controlled by said temperature regulator in response to the temperature of said enclosure reaching said desired enclosure temperature for arresting operation of said first signal and for initiating operation of said second signal and for initiating said desired timing operation of said timer, means governed by said temperature regulator after the temperature of said enclosure reaches said desired enclosure temperature for selectively controlling the operation of said heating element, thereby to maintain the temperature of said enclosure substantially at said desired enclosure temperature, means controlled by said timer in response to the completion of said desired timing operation thereof for arresting operation of said second signal and for initiating operation of said third signal and for arresting operation of said heating element, whereby the temperature of said enclosure is decreased from said desired enclosure temperature through said desired control temperature toward the ambient temperature, and stop means controlled by said temperature regulator in response to the temperature of said enclosure reaching said desired control temperature for arresting operation of said fan and for arresting operation of said third signal.

HAROLD W. LINDSAY.